Aug. 18, 1942.  C. K. WOOLSEY  2,293,272
SWEEP FOR CULTIVATORS
Filed March 17, 1941  2 Sheets-Sheet 1
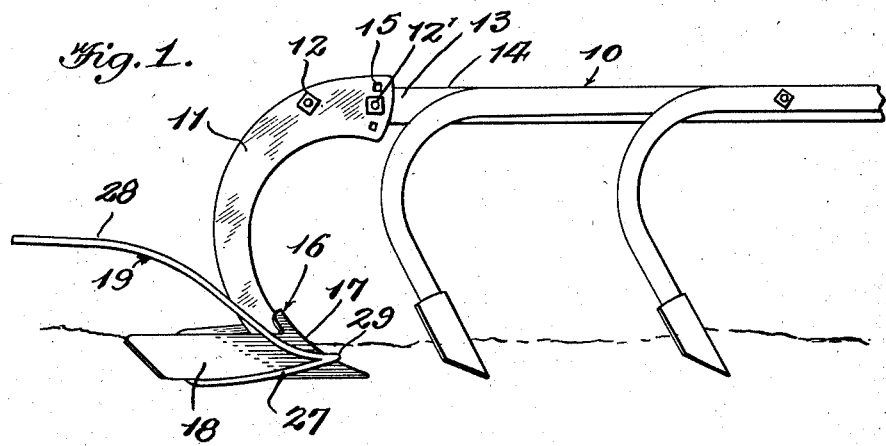
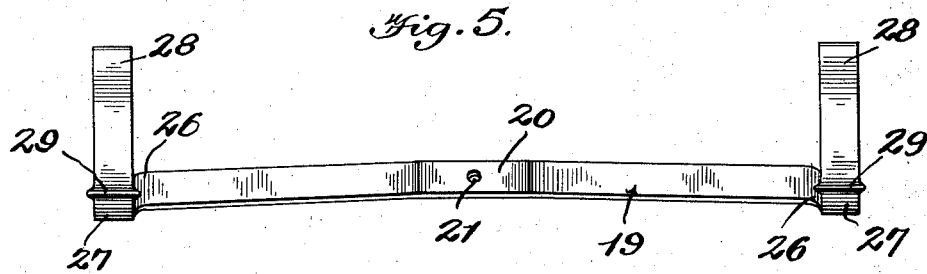
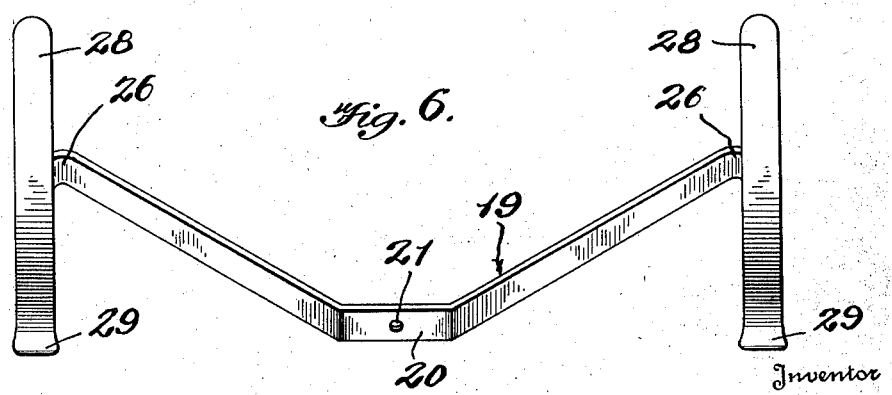
Inventor
Convers K. Woolsey,
By Christian K. Nielsen
Attorney Aug. 18, 1942.   C. K. WOOLSEY   2,293,272
SWEEP FOR CULTIVATORS
Filed March 17, 1941   2 Sheets-Sheet 2
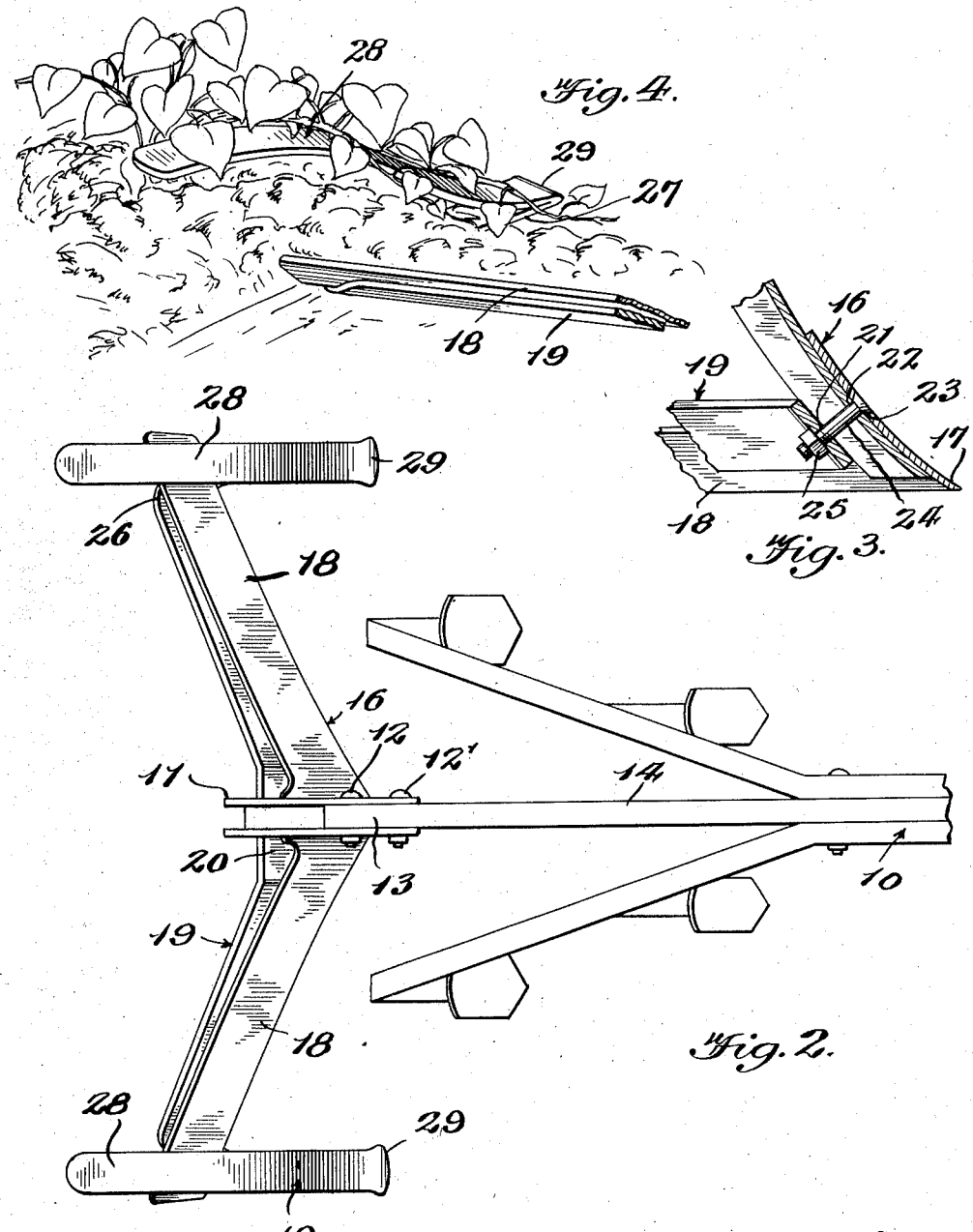
Inventor
Convers K. Woolsey,
By Christian L. Nielsen
Attorney Patented Aug. 18, 1942

2,293,272

UNITED STATES PATENT OFFICE 2,293,272

SWEEP FOR CULTIVATORS

Convers K. Woolsey, Aiken, S. C.

Application March 17, 1941, Serial No. 383,842

4 Claims. (Cl. 97—192)

This invention relates to a sweep for cultivators and it consists in the constructions, arrangements and combinations herein described and claimed.

It is an object of the invention to provide a sweep construction which may be readily attached to cultivators now in general use. It is also an object of the invention to provide a sweep construction in which a vine deflecting and elevating means is incorporated, increasing the efficiency of the sweep proper, as well as materially increasing the growth of plants under cultivation, by reason of the fact that by deflecting and elevating the vines, such as sweet-potatoes, the earth displaced by the sweep is forced inwardly under the vines and about the roots of the plants.

It is a still further object of the invention to construct the deflecting and elevating means in a manner to reinforce the sweep proper, so as to reduce liability of breakage thereof.

Additional objects, advantages and features of invention will be apparent from the following description and accompanying drawings, wherein Figure 1 is a side elevation of a cultivator having my sweep attached thereto.

Figure 2 is a top plan view thereof.

Figure 3 is a vertical sectional view illustrating the mounting of the sweep and vine deflector-elevator.

Figure 4 is a perspective view of the sweep and vine deflector-elevator, partly in section, illustrating the position of the parts, when in use.

Figure 5 is a front view of the vine elevator-deflector, and

Figure 6 is a top plan view thereof.

Attention is first invited to Figures 1 and 2 of the drawings, wherein there is shown a conventional type of cultivator, indicated at 10, having an arcuately curved leg 11 fixed as at 12 to the rear extension 13 of the cultivator beam 14. Preferably the leg is provided with a series of arcuately spaced apertures 15 for reception of a bolt and nut 12', the bolt passing through an aperture formed in the beam 14 of the cultivator. Thus it will be seen that by selecting an aperture 15 for reception of the bolt 12', the depth at which the sweep may penetrate the ground can be adjusted.

The lower end of the leg 11 is apertured at a suitable point and is so shaped as to snugly support a sweep blade 16 as will now be described. The sweep blade 16 is provided with a nose or point 17 from which there are extended rearwardly diverging blades 18, the blades being of a length greater than the position of the outermost shovels of the cultivator. Ordinarily, the shovels of the cultivator will be drawn through the space between two rows of a growing crop, and the sweep blades 18 therefore will function to move earth loosened by the cultivator blades inwardly toward the plants in the rows.

The curvature of the leg 11 is such as to position the sweep 16 at a slight angle to the line of travel thereof and earth engaged by the blades 18 will thus be slightly elevated and caused to travel longitudinally along the blades in a rearward diverging direction toward the ends for discharge therebeyond and adjacent the bases of the plants in the row under cultivation.

In many plant growths, such as sweet potatoes, numerous vines of the plants will occupy the space between the rows, and in order that the earth moved by the blades 18 may be deposited adjacent or upon the base or roots of the plants, it is necessary that these vines be elevated to such position as to permit free passage of the earth. To this end provision is made of a deflector-elevator, generally indicated by the reference character 19, which consists of an elongated metal blade bent intermediate its ends to form a seat 20. The seat 20 is apertured as at 21, and when in operative position upon the leg 11 will register with apertures 22 and 23 of the leg and sweep, respectively. Through the aligned apertures a bolt 24 is extended and secured by a nut 25, and thus the sweep and deflector-elevator will be rigidly secured to the leg.

As shown in Figure 3, the blade of the elevator 19 is of less width than the sweep blades 18 and is fixed to the leg 11 so as to clear the ground at such point. The blades of the deflector-elevator 19 extend parallel beneath the sweep blades 18 to a point inward of the extremities of the blades 18, whence they are directed downwardly, so as to lie beneath and at a slight forward inclination, as at 26, so as to lie beneath the cutting edge of the respective blades 18. The blades of the deflector-elevator are continued forwardly in parallel relation to one another, as clearly shown in Figure 5. The forward extensions are designated by the reference character 27 and from consideration of the showing in Figure 1, serve as shoes for engaging the ground and also function to support the sweep blades 18 adjacent their ends. Thus the blades are given support in addition to that provided by the bolt 24.

The extensions 27 of the blade may be of any approved length, the blade being bent upon itself forming a nose 29 and extended rearwardly as at 28, in the form of an ogee curve. The extended portion 28 functions as a deflector for vines of the plants and therefore is preferably of a length extending rearwardly of the sweep and deflector blades, and spaced a suitable distance above the extensions 27. Preferably the extension 27 is given a slight upward curvature so that the nose 29 lies slightly below the surface of the earth under cultivation, as clearly shown in Figure 1.

In use, the cultivator will be drawn along a furrow, the shovels thereof loosening the earth in advance of the sweep 16. As the sweep 16 engages the earth it will be moved longitudinally in divergent rearward directions and since the deflector-elevators 19 are arranged to elevate and deflect any vines occupying the space between two row crops, the earth following the blades 18 of the sweep may freely pass to points inwardly upon or adjacent the roots of the plants, as illustrated in Figure 4. It will thus be seen that in addition to loosening earth in the furrow, I also replenish earth in and around the roots of the plants and this has been found to be highly beneficial to the plants, as well as the production of a more uniform growth of a crop.

While I have shown and specifically described my invention, this is by way of illustration only, and I consider as my own, all such modifications as fairly fall within the scope of the appended claims.

I claim:

1. A combined sweep and vine elevating means comprising a sweep having means for attachment to a cultivator or the like, said sweep having rearwardly diverging blades, a vine elevating means having a pair of blades complemental to the blades of the sweep and stopping short of the ends thereof, the blades of the elevating means having forwardly extended ground engaging extensions and rearwardly recurved portions, the recurved portions being positioned above the ground engaging extensions.

2. In a combined sweep and vine elevating means, a leg having means at one end for attachment to a cultivator or the like, a sweep member connected to the other end of the leg, said sweep having a pair of rearwardly diverging ground-engaging blades, a vine elevating means fixed to the leg rearwardly of the sweep member comprising a pair of blades in parallel relation to the blades of the sweep, said blades stopping short of the sweep blades and being directed downwardly beneath respective blades of the sweep member and thence forwardly and recurved rearwardly.

3. The structure of claim 2 in which the leg is adjustably mounted upon the cultivator for varying the cutting position of the sweep blades.

4. In a combined sweep and vine elevating means, a leg having means at one end for attachment to a cultivator or the like, a sweep member connected to the other end of the leg, said sweep comprising a pair of rearwardly diverging ground-engaging blades, a vine elevating means fixed to the leg rearwardly of the sweep member, said elevating means comprising a pair of blades, one arranged parallel to respective blades of the sweep member, each blade of the elevating means having a forward ground-engaging extension and an upwardly and rearwardly recurved portion, said sweep blades extended between the ground-engaging extensions and the upwardly and rearwardly recurved portions of the elevating means, and in seating engagement upon the former.

CONVERS K. WOOLSEY.